(12) United States Patent
Wagoner et al.

(10) Patent No.: US 8,975,768 B2
(45) Date of Patent: Mar. 10, 2015

(54) METHODS FOR OPERATING WIND TURBINE SYSTEM HAVING DYNAMIC BRAKE

(71) Applicant: General Electric Company, Schenectady, NY (US)

(72) Inventors: Robert Gregory Wagoner, Roanoke, VA (US); Amy M. Ridenour, Salem, VA (US)

(73) Assignee: General Electic Company, Schenectady, NY (US)

( * ) Notice: Subject to any disclaimer, the term of this patent is extended or adjusted under 35 U.S.C. 154(b) by 0 days.

(21) Appl. No.: 13/910,519

(22) Filed: Jun. 5, 2013

(65) Prior Publication Data

US 2014/0361538 A1    Dec. 11, 2014

(51) Int. Cl.
*F03D 9/00* (2006.01)
*H02P 9/04* (2006.01)
*F03D 7/02* (2006.01)

(52) U.S. Cl.
CPC .................................. *F03D 7/0244* (2013.01)
USPC ............................................... 290/44; 290/55

(58) Field of Classification Search
CPC . Y02E 10/70; F05B 2240/21; F05B 2240/24; F05B 2240/10; F05B 2240/20; F03D 7/00; B60K 16/00; B60L 8/006; H02J 3/386; H02P 2009/004; G05B 2219/2619
USPC ........ 290/44, 55; 415/1; 416/1; 700/287, 286
See application file for complete search history.

(56) References Cited

U.S. PATENT DOCUMENTS

| | | | |
|---|---|---|---|
| 4,352,049 A | 9/1982 | Franz, Jr. | |
| 6,577,483 B1 * | 6/2003 | Steicher et al. | 361/90 |
| 6,725,134 B2 * | 4/2004 | Dillen et al. | 701/19 |
| 7,102,247 B2 | 9/2006 | Feddersen | |
| 7,164,562 B2 | 1/2007 | Virtanen | |
| 7,332,827 B2 | 2/2008 | Nielsen | |
| 7,518,256 B2 | 4/2009 | Juanarena Saragueta et al. | |
| 7,786,608 B2 * | 8/2010 | Menke | 290/44 |
| 7,859,125 B2 | 12/2010 | Nielsen et al. | |
| 7,939,954 B2 | 5/2011 | Ruiz Flores et al. | |
| 8,022,565 B2 * | 9/2011 | Scholte-Wassink et al. | 290/44 |
| 8,093,742 B2 | 1/2012 | Gupta et al. | |
| 8,207,623 B2 | 6/2012 | Rivas et al. | |
| 8,258,642 B2 * | 9/2012 | Koerber | 290/44 |
| 8,373,293 B2 | 2/2013 | Engelhardt et al. | |
| 8,684,117 B2 * | 4/2014 | Ptacek et al. | 180/68.2 |

(Continued)

FOREIGN PATENT DOCUMENTS

WO    WO 2010/108515 A1    9/2010

OTHER PUBLICATIONS

EP Search Report, Nov. 10, 2014.

*Primary Examiner* — Tulsidas C Patel
*Assistant Examiner* — Charles Reid, Jr.
(74) *Attorney, Agent, or Firm* — Dority & Manning, P.A.

(57) ABSTRACT

Wind turbine systems and methods for operating wind turbine systems are provided. In one embodiment, a method includes gating on a dynamic brake switch of a dynamic brake in a wind turbine power converter when an experienced direct current (DC) bus voltage is equal to or greater than a threshold DC bus voltage. The method further includes disabling a threshold temperature rating for the dynamic brake switch when the dynamic brake switch is gated on, and gating off the dynamic brake switch when the experienced DC bus voltage is less than the threshold DC bus voltage.

20 Claims, 3 Drawing Sheets

(56) References Cited

U.S. PATENT DOCUMENTS

| | | |
|---|---|---|
| 2005/0174081 A1* | 8/2005 | Nguyen et al. ............... 318/376 |
| 2009/0008937 A1 | 1/2009 | Erdman et al. |
| 2009/0079193 A1 | 3/2009 | Nielsen et al. |
| 2009/0251081 A1* | 10/2009 | Thunes et al. ............... 318/375 |
| 2011/0140430 A1* | 6/2011 | Ritter et al. .................... 290/44 |
| 2011/0140438 A1* | 6/2011 | Delmerico et al. ............. 290/55 |
| 2011/0210553 A1 | 9/2011 | Engelhardt et al. |
| 2011/0215772 A1 | 9/2011 | Sheng et al. |
| 2012/0098345 A1* | 4/2012 | Oldenburg et al. ............ 307/80 |
| 2013/0033268 A1 | 2/2013 | Parkhou et al. |
| 2013/0259686 A1* | 10/2013 | Blom et al. ....................... 416/1 |
| 2013/0261832 A1* | 10/2013 | Bastien et al. ................ 700/296 |
| 2013/0334818 A1* | 12/2013 | Mashal et al. .................. 290/44 |

\* cited by examiner

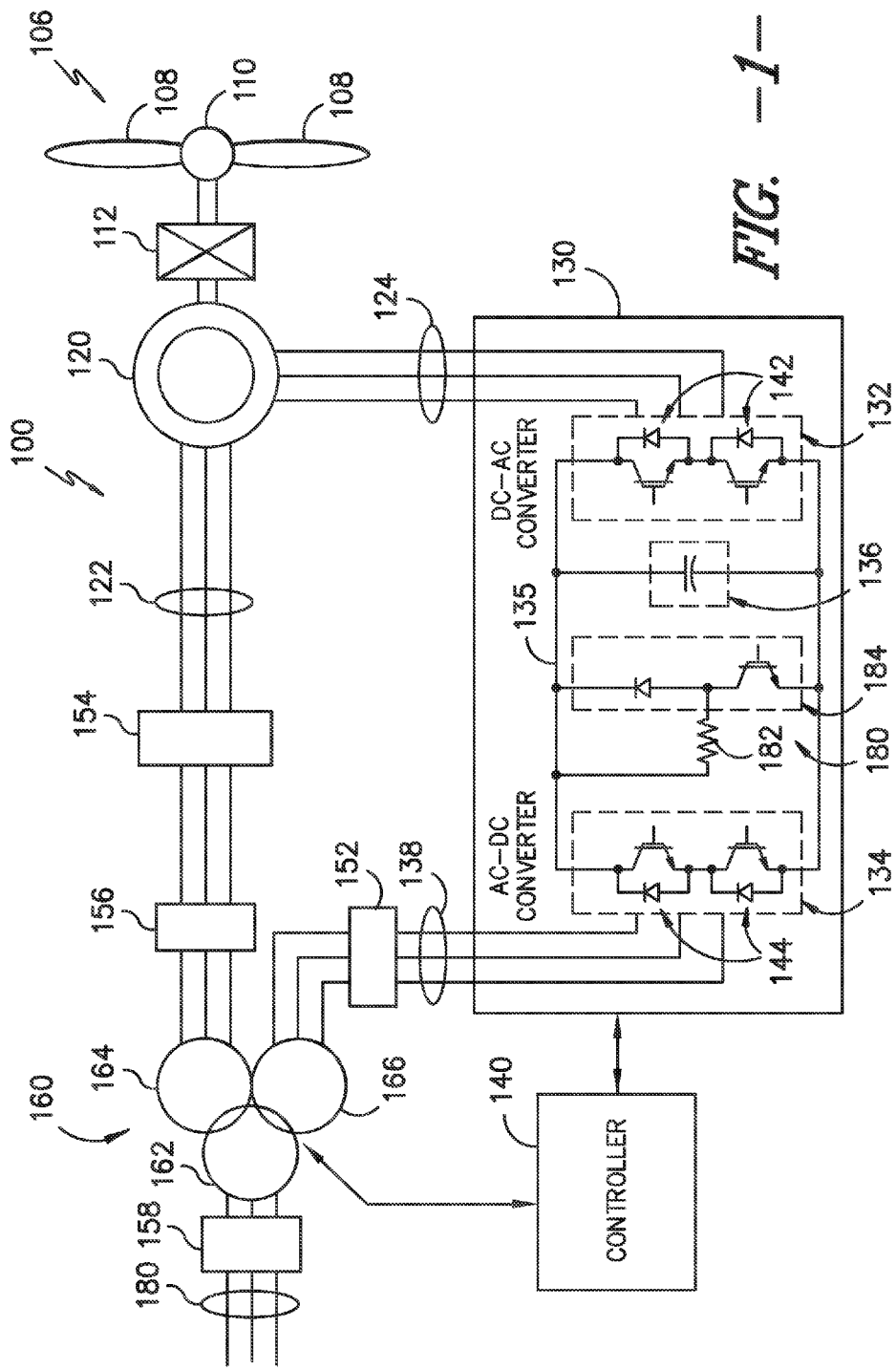
FIG. -1-

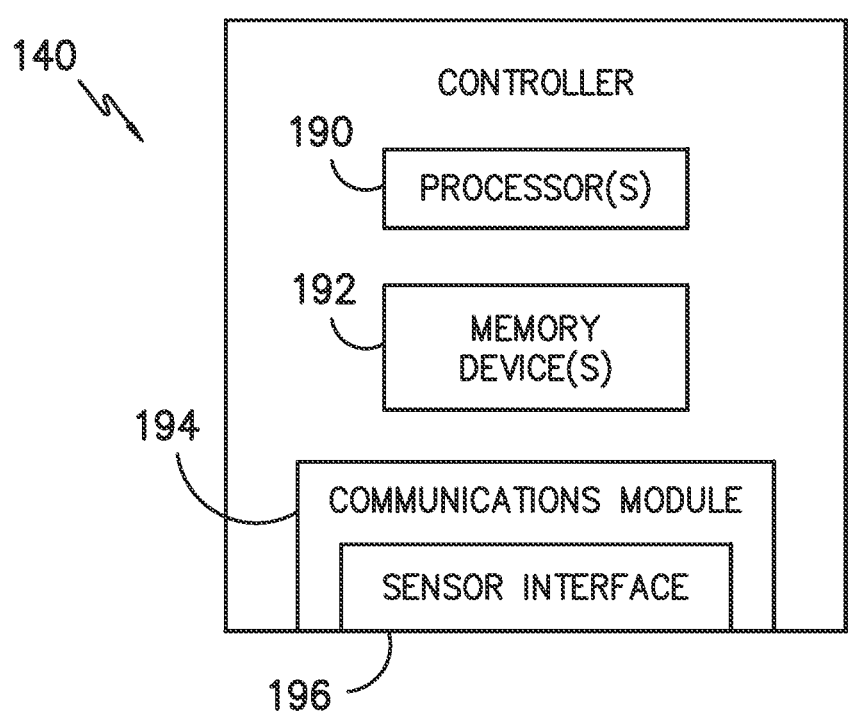
FIG. -2-

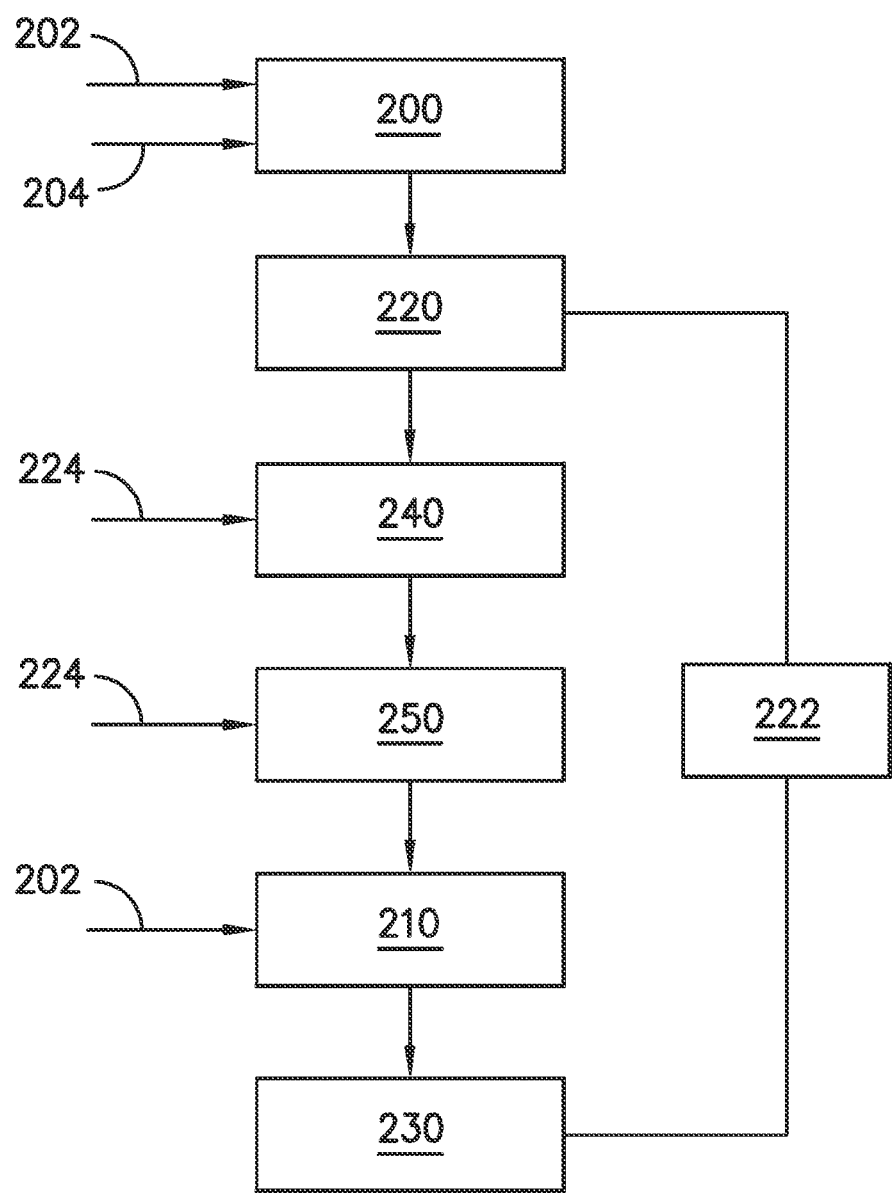
FIG. -3-

METHODS FOR OPERATING WIND TURBINE SYSTEM HAVING DYNAMIC BRAKE

FIELD OF THE INVENTION

The present disclosure relates generally to wind turbines, and more particularly to methods for operating such wind turbines and in particular dynamic braking of such systems.

BACKGROUND OF THE INVENTION

Wind turbines have received increased attention as a renewable energy source. Wind turbines use the wind to generate electricity. The wind turns multiple blades connected to a rotor. The spin of the blades caused by the wind spins a shaft of the rotor, which connects to a generator that generates electricity. Certain wind turbines include a doubly fed induction generator (DFIG) to convert wind energy into electrical power suitable for output to an electrical grid. DFIGs are typically connected to a converter that regulates the flow of electrical power between the DFIG and the grid. More particularly, the converter allows the wind turbine to output electrical power at the grid frequency regardless of the rotational speed of the wind turbine blades.

A typical DFIG system includes a wind driven DFIG having a rotor and a stator. The stator of the DFIG is coupled to the electrical grid through a stator bus. A power converter is used to couple the rotor of the DFIG to the electrical grid. The power converter can be a two-stage power converter including both a rotor side converter and a line side converter. The rotor side converter can receive alternating current (AC) power from the rotor via a rotor bus and can convert the AC power to a DC power. The line side converter can then convert the DC power to AC power having a suitable output frequency, such as the grid frequency. The AC power is provided to the electrical grid via a line bus. An auxiliary power feed can be coupled to the line bus to provide power for components used in the wind turbine system, such as fans, pumps, motors, and other components of the wind turbine system.

A typical DFIG system includes a two-winding transformer having a high voltage primary (e.g. greater than 12 KVAC) and a low voltage secondary (e.g. 575 VAC, 690 VAC, etc.) to couple the DFIG system to the electrical grid. The high voltage primary can be coupled to the high voltage electrical grid. The stator bus providing AC power from the stator of the DFIG and the line bus providing AC power from the power converter can be coupled to the low voltage secondary. In this system, the output power of the stator and the output power of the power converter are operated at the same voltage and combined into the single transformer secondary winding at the low voltage.

More recently, DFIG systems have included a three winding transformer to couple the DFIG system to the electrical grid. The three winding transformer can have a high voltage (e.g. greater than 12 KVAC) primary winding coupled to the electrical grid, a medium voltage (e.g. 6 KVAC) secondary winding coupled to the stator bus, and a low voltage (e.g. 575 VAC, 690 VAC, etc.) auxiliary winding coupled to the line bus. The three winding transformer arrangement can be preferred in increased output power systems (e.g. 3 MW systems) as it reduces the current in the stator bus and other components on the stator side of the DFIG.

During operation of wind turbine systems, including DFIG systems, various grid faults can occur, which result in a disconnect between generation of power by the wind turbine and receipt of that power by the grid. This can result in excessive energy in the power converter, which can cause damage to the converter.

Various approaches have been utilized to reduce the risk of overvoltage conditions in power converters. For example, crowbars have been utilized to prevent excess energy from reaching the power converter when grid faults occur. However, the use of crowbars can cause grid disturbances and generator torque transients, which can damage both the grid and the wind turbine system.

More recently, dynamic brake systems have been utilized. Conventional dynamic brake systems include a resistor in series with a switch, such as an insulated-gate bipolar transistor (IGBT), and absorb excess energy in the converter when gated on during when a grid fault occurs. However, conventional dynamic brake systems are not without drawbacks. For example, when a dynamic brake is gated on, temperatures of dynamic brake components, such as the dynamic brake switch, may begin to increase. In some cases during operation of dynamic brakes, a dynamic brake may be gated off due to increased temperature conditions before sufficient energy has been absorbed, thus again risking damage to the power converter. For example, the dynamic brake may be gated off due to increased temperature conditions, but before increased voltage levels are allowed to dissipate. These increased voltage levels can thus be transmitted through the power converter and system in general, damaging these components.

Accordingly, improved methods for operating wind turbine systems are desired. In particular, improved methods which utilize dynamic brakes and provide reduced risk of power converter damage would be advantageous.

BRIEF DESCRIPTION OF THE INVENTION

Aspects and advantages of the invention will be set forth in part in the following description, or may be obvious from the description, or may be learned through practice of the invention.

In one embodiment, the present disclosure is directed to a method for operating a wind turbine system. The method includes gating on a dynamic brake switch of a dynamic brake in a wind turbine power converter when an experienced direct current (DC) bus voltage is equal to or greater than a threshold DC bus voltage. The method further includes disabling a threshold temperature rating for the dynamic brake switch when the dynamic brake switch is gated on, and gating off the dynamic brake switch when the experienced DC bus voltage is less than the threshold DC bus voltage.

In another embodiment, the present disclosure is directed to a method for operating a dynamic brake of a wind turbine power converter. The method includes gating on a dynamic brake switch of the dynamic brake when an experienced direct current (DC) bus voltage is equal to or greater than a threshold DC bus voltage. The method further includes disabling a threshold temperature rating for the dynamic brake switch when the dynamic brake switch is gated on, and tripping the power converter off when an experienced temperature of the dynamic brake switch is equal to or greater than the threshold temperature. The method further includes gating off the dynamic brake switch when the experienced DC bus voltage is less than the threshold DC bus voltage, and enabling the threshold temperature rating for the dynamic brake switch when the dynamic brake switch is gated off.

In another embodiment, the present disclosure is directed to a wind turbine system. The system includes a wind driven generator having a rotor and a stator, the stator providing AC power to a stator bus. The system further includes a power converter coupled to the generator, the power converter including a dynamic brake, the dynamic brake including a dynamic brake switch. The system further includes a controller in communication with the power converter. The controller is operable to gate on the dynamic brake switch when an experienced direct current (DC) bus voltage is equal to or greater than a threshold DC bus voltage, disable a threshold temperature rating for the dynamic brake switch when the dynamic brake switch is gated on, and gate off the dynamic brake switch when the experienced DC bus voltage is less than the threshold DC bus voltage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a DFIG wind turbine system according to one embodiment of the present disclosure;

FIG. 2 illustrates a schematic diagram of one embodiment of suitable components that may be included within a controller of a wind turbine system;

FIG. 3 is a flow chart illustrating a method according to one embodiment of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 depicts an exemplary doubly-fed induction generator (DFIG) wind turbine system 100 according to an exemplary embodiment of the present disclosure. In the exemplary system 100, a rotor 106 includes a plurality of rotor blades 108 coupled to a rotating hub 110, and together define a propeller. The propeller is coupled to an optional gear box 112, which is, in turn, coupled to a generator 120. The generator 120 includes a stator and a rotor, as is generally understood. In accordance with aspects of the present disclosure, the generator 120 is a doubly fed induction generator (DFIG) 120. It should be understood, however, that the present disclosure is not limited to DFIG systems 100 and DFIGs 120, and rather that any suitable wind turbine system and generator, including for example full power conversion systems and generators, is within the scope and spirit of the present disclosure.

DFIG 120 is typically coupled to a stator bus 122 and a power converter 130 via a rotor bus 124. The stator bus 122 provides an output multiphase power (e.g. three-phase power) from a stator of DFIG 120 and the rotor bus 124 provides an output multiphase power (e.g. three-phase power) of the rotor of DFIG 120. Referring to the power converter 130, DFIG 120 is coupled via the rotor bus 124 to a rotor side converter 132 or plurality of rotor side converters 132, such as three converters 132 for a three-phase system. Each rotor side converter 132 is coupled to a line side converter 134 which in turn is coupled to a line side bus 138. One or more line side converters 134 may be included, such as three converters 134 for a three-phase system.

In exemplary configurations, the rotor side converter 132 and the line side converter 134 are configured for normal operating mode in a three-phase, pulse width modulation (PWM) arrangement using insulated gate bipolar transistors (IGBTs) as switching devices. Other suitable switching devices can be used, such as insulated gate commuted thyristors, MOSFETs, bipolar transistors, silicon controlled rectifiers, or other suitable switching devices. The rotor side converter 132 and the line side converter 134 can be coupled via a DC link 135 across which is the DC link capacitor 136.

The power converter 130 can be coupled to controller 140 to control the operation of the rotor side converter 132 and the line side converter 134. For instance, the controller 140 can send control commands to the rotor side converter 132 and line side converter 134 to control the modulation of switching elements (such as IGBTs) used in the power converter 130 to provide a desired real and reactive power output. Switching elements may include, for example, one or more rotor side switches 142, which may be components of the rotor side converter 132, and one or more line side switches 144, which may be components of the line side converter 138.

As illustrated, the system 100 includes a transformer 160 coupling the wind turbine system 100 to an electrical grid 180. The transformer 160 of FIG. 1 is a three-winding transformer that includes a high voltage (e.g. greater than 12 KVAC) primary winding 162 coupled to the electrical grid, a medium voltage (e.g. 6 KVAC) secondary winding 164 coupled to the stator bus 122, and a low voltage (e.g. 575 VAC, 690 VAC, etc.) auxiliary winding 166 coupled to the line bus 138. It should be understood that the transformer 160 can be a three-winding transformer as shown, or alternatively may be a two-winding transformer having only a primary winding 162 and a secondary winding 164; may be a four-winding transformer having a primary winding 162, a secondary winding 164, an auxiliary winding 166, and an additional auxiliary winding; or may have any other suitable number of windings.

In operation, power generated at DFIG 120 by rotating the rotor 106 is provided via a dual path to electrical grid 180. The dual paths are defined by the stator bus 122 and the rotor bus 124. On the rotor bus 124 side, sinusoidal multi-phase (e.g. three-phase) alternating current (AC) power is provided to the power converter 130. The rotor side power converter 132 converts the AC power provided from the rotor bus 124 into direct current (DC) power and provides the DC power to the DC link 135. Switching devices (e.g. IGBTs) used in parallel bridge circuits of the rotor side power converter 132 can be modulated to convert the AC power provided from the rotor bus 124 into DC power suitable for the DC link 135.

The line side converter 134 converts the DC power on the DC link 135 into AC power at a frequency suitable for the electrical grid 180. In particular, switching devices (e.g. IGBTs) used in bridge circuits of the line side power converter 134 can be modulated to convert the DC power on the DC link 135 into AC power on the line side bus 138. The power from the power converter 130 can be provided via the auxiliary winding 166 of the transformer 160 to the electrical grid 180.

The power converter 130 can receive control signals from, for instance, the controller 140. The control signals can be based, among other things, on sensed conditions or operating characteristics of the wind turbine system 100. For instance, the control signals can be based on sensed voltage associated with the transformer 160 as determined by a voltage sensor. As another example, the control signals can be based on sensed voltage associated with an auxiliary power feed as determined by a voltage sensor.

Typically, the control signals provide for control of the operation of the power converter 130. For example, feedback in the form of sensed speed of the DM 120 can be used to control the conversion of the output power from the rotor bus 124 to maintain a proper and balanced multi-phase (e.g. three-phase) power supply. Other feedback from other sensors can also be used by the controller 140 to control the power converter 130, including, for example, stator and rotor bus voltages and current feedbacks. Using the various forms of feedback information, switching control signals (e.g. gate timing commands for IGBTs), stator synchronizing control signals, and circuit breaker signals can be generated.

On the stator bus 122 side, sinusoidal multi-phase (e.g. three-phase) alternating current (AC) power is provided from the stator of the generator 120 to the stator bus 122, and from the stator bus 122 to the transformer 160, and in particular to the secondary winding 164 thereof. Various circuit breakers, fuses, contactors, and other devices, such as grid circuit breaker 158, stator bus circuit breaker 156, stator switch 154, and line bus circuit breaker 152, can be included in the system 100 to connect or disconnect corresponding buses, for example, when current flow is excessive and can damage components of the wind turbine system 100 or for other operational considerations. Additional protection components can also be included in the wind turbine system 100.

Referring still to FIG. 1, a dynamic brake 180 may be provided in the power converter 130 between the rotor side converter 132 and the line side converter 134. The dynamic brake 180, when gated on, absorbs energy in the converter 130. For example, in exemplary embodiments as shown, a dynamic brake 180 may include a resistor 182 in series with a switch 184, which may for example be an IGBT.

The present disclosure is further directed to methods for operating wind turbine systems 100, in particular those including dynamic brakes 180. In particular, controller 140 may be utilized to perform various steps of such methods as discussed herein. Referring now to FIG. 2, it should be appreciated that the turbine controller 140 may generally comprise a computer or any other suitable processing unit. Thus, in several embodiments, the turbine controller 140 may include one or more processor(s) and associated memory device(s) configured to perform a variety of computer-implemented functions, as discussed herein. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the turbine controller 140 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 140 to perform various computer-implemented functions including, but not limited to, performing proportional integral derivative ("PID") control algorithms, including various calculations within one or more PID control loops, and various other suitable computer-implemented functions. In addition, the turbine controller 140 may also include various input/output channels for receiving inputs from sensors and/or other measurement devices and for sending control signals to various components of the wind turbine system 100.

FIG. 2 provides a block diagram of one embodiment of suitable components that may be included within the turbine controller 140 in accordance with aspects of the present subject matter. As shown, the controller 140 may include one or more processor(s) 190 and associated memory device(s) 192 configured to perform a variety of computer-implemented functions (e.g., performing the methods, steps, calculations and the like disclosed herein). Additionally, the controller 140 may also include a communications module 194 to facilitate communications between the controller 140 and the various components of the wind turbine system 100. Moreover, the communications module 194 may include a sensor interface 196 (e.g., one or more analog-to-digital converters) to permit input signals transmitted from, for example, various sensor, to be converted into signals that can be understood and processed by the processors 190.

Referring now to FIG. 3, the present disclosure is further directed to methods for operating wind turbine systems 100, particularly through advantageous use of the dynamic brake 180. Such methods may include, for example, the step 200 of gating the dynamic brake switch 184 on when an experienced direct current (DC) bus voltage 202 is equal to or greater than a threshold DC bus voltage 204. The experienced DC bus voltage 202 is generally the DC bus voltage 202 actually experienced by the converter 130 during operation of the system 100. The threshold DC bus voltage 204 is thus a threshold voltage for the dynamic brake 180, such that gating on occurs when the threshold DC bus voltage 204 is met or exceeded.

Methods according to the present disclosure may further include, for example, the step 210 of gating the dynamic brake switch 184 off when the experienced DC bus voltage 202 is less than the threshold DC bus voltage 204.

Methods according to the present disclosure may further include, for example, the step 220 of disabling a threshold temperature rating 222 for the dynamic brake switch 184 when the dynamic brake switch 184 is gated on. The threshold temperature rating 222 is an over-temperature protection mechanism for the dynamic brake switch 184. Thus, the rating 222 is a threshold temperature limit for the dynamic brake switch 184. When the threshold temperature rating 222 is enabled, the dynamic brake switch 184 may be automatically opened, thus gating off the dynamic brake switch 184 and disengaging the dynamic brake 180, when an experienced temperature 224 of the dynamic brake switch 184 meets or exceeds the threshold temperature utilized for the threshold temperature rating 222. However, when the threshold temperature rating 222 is disabled, the dynamic brake switch 184 may remain closed, thus allowing the dynamic brake switch 184 to remain gated on and the dynamic brake 180 to remain engaged, when the experienced temperature 224 meets or exceeds the threshold temperature utilized for the threshold temperature rating 222.

Monitoring of the experienced temperature 224 of the dynamic brake switch 184 may, for example, be performed through the use of suitable sensors in or around the switch 184 in general and/or through interaction with the controller 140, such as through the receipt of suitable monitoring signals by the controller 140 from the switch 184.

By disabling the threshold temperature rating 222 for the dynamic brake switch 184 when the dynamic brake switch 184 is gate on, the present disclosure advantageously facilitates improved system 100 operation. For example, by maintaining the dynamic brake switch 184 in a gated on condition and the dynamic brake 180 thus engaged, even when the threshold temperature rating 222 is exceeded, the dynamic brake 180 may continue to dissipate high voltage levels in the converter 130 and system 100. Such dissipation advantageously protects the converter 130 and system 100 from damage due to such increased voltage levels, and the risk of the dynamic brake switch 184 being gated off before enough dissipation has occurred is eliminated.

Methods according to the present disclosure may further include, for example, the step 230 of enabling the threshold temperature rating 222 when the dynamic brake switch 184 is gated off. Thus, over-temperature protection of the switch 184 may occur when the dynamic brake 180 is not being utilized.

Methods according to the present disclosure may further include, for example, the step 240 of tripping the power converter 130 off when the experienced temperature 224 of the dynamic brake switch 184 is equal to or greater than the threshold temperature, which is the temperature utilized in the threshold temperature rating 222. Since the rating 222 is disabled and the dynamic brake 180 thus remains on when the threshold temperature is met or exceeded, tripping the power converter 130 off further prevents damage to the converter 130 due to, for example high voltage issues when the dynamic brake switch 184 is gated on. Tripping the power converter 130 off can be completed by opening, or gating off, one or more switches, circuit breakers, contactors, etc. of the converter 130 or system 100 in general. For example, suitable components which may be opened include, for example, rotor side switches 142, line side switches 144, stator side switches 154, line bus circuit breakers 152, stator bus circuit breakers 156, and/or grid circuit breakers 158.

Methods according to the present disclosure may further include, for example, the step 250 of tripping the power converter 130 on when the experienced temperature 224 is less than the threshold temperature. This may facilitate use of the power converter 130 after the risk of damage from, for example, high voltage issues when the dynamic brake switch 184 is gated on are no longer present.

It should be understood that any one or more of the various steps discussed herein may advantageously be performed by the controller 140. For example, the controller 140 may be operable to gate on the dynamic brake switch 184 when the experienced DC bus voltage 202 is equal to or greater than the threshold DC bus voltage 204; disable the threshold temperature rating 222 for the dynamic brake switch 184 when the dynamic brake switch 184 is gated on; and/or gate off the dynamic brake switch 184 when the experienced DC bus voltage 202 is less than the threshold DC bus voltage 204. Further, the controller 140 may be operable to enable the threshold temperature rating 222 for the dynamic brake switch 184 when the dynamic brake switch 184 is gated off; trip the power converter 130 off when the experienced temperature 224 of the dynamic brake switch 184 is equal to or greater than the threshold temperature 222, and/or trip the power converter 130 on when the experienced temperature 224 of the dynamic brake switch 184 is less than the threshold temperature 222.

It should additionally be noted that in some embodiments, the various switches, circuit breakers, fuses, contactors, etc. utilized according to the present disclosure may have ratings approximately equal to the overall system requirements. Alternatively, however, in some embodiments, one or more such switches, circuit breakers, fuses, contactors, etc. may have ratings substantially higher than the overall system requirements. For example, for a 690 VAC system, 690 VAC or 700 VAC ratings may be utilized in some embodiments, while in other embodiments, 1200 VAC ratings may be utilized. Such higher ratings, which may for example, be between approximately 1.5 and approximately 2 times the system requirements or more, may advantageously reduce damage in the case of grid faults, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine system, the method comprising:
    gating on a dynamic brake switch of a dynamic brake in a wind turbine power converter when an experienced direct current (DC) bus voltage is equal to or greater than a threshold DC bus voltage;
    disabling a threshold temperature rating for the dynamic brake switch when the dynamic brake is gated on; and
    gating off the dynamic brake switch when the experienced DC bus voltage is less than threshold DC bus voltage.

2. The method of claim 1, further comprising enabling the threshold temperature rating for the dynamic brake switch when the dynamic brake switch is gated off.

3. The method of claim 1, further comprising tripping the power converter off when an experienced temperature of the dynamic brake switch is equal to or greater than the threshold temperature.

4. The method of claim 3, wherein tripping the power converter off comprises opening one of a line side switch, a rotor side switch, a stator side switch, a line bus circuit breaker, a stator bus circuit breaker, or a grid circuit breaker.

5. The method of claim 3, further comprising tripping the power converter on when the experienced temperature of the dynamic brake switch is less than the threshold temperature.

6. The method of claim 1, wherein the dynamic brake switch is an insulated-gate bipolar transistor.

7. The method of claim 1, wherein the power converter is coupled to a rotor of a doubly fed induction generator.

8. The method of claim 1, wherein the step of disabling the threshold temperature rating is performed by a controller of the wind turbine system.

9. A method for operating a dynamic brake of a wind turbine power converter, the method comprising:
    gating on a dynamic brake switch of the dynamic brake when an experienced direct current (DC) bus voltage is equal to or greater than a threshold DC bus voltage;
    disabling a threshold temperature rating for the dynamic brake switch when the dynamic brake switch is gated on;

tripping the power converter off when an experienced temperature of the dynamic brake switch is equal to or greater than the threshold temperature;

gating off the dynamic brake switch when the experienced DC bus voltage is less than the threshold DC bus voltage; and enabling the threshold temperature rating for the dynamic brake switch when the dynamic brake switch is gated off.

10. The method of claim 9, wherein tripping the power converter off comprises opening one of a line side switch, a rotor side switch, a stator side switch, a line bus circuit breaker, a stator bus breaker, or a grid circuit breaker.

11. The method of claim 9, further comprising tripping the power converter on when the experienced temperature of the dynamic brake switch is less than the threshold temperature.

12. The method of claim 9, wherein the dynamic brake switch is an insulated-gate bipolar transistor.

13. The method of claim 9, wherein the power converter is coupled to a rotor of a doubly fed induction generator.

14. The method of claim 9, wherein the steps of disabling the threshold temperature rating and enabling the threshold temperature are performed by a controller of the wind turbine system.

15. A wind turbine system, comprising:
a wind driven generator having a rotor and a stator, the stator providing AC power to a stator bus;
a power converter coupled to the generator, the power converter comprising a dynamic brake, the dynamic brake comprising a dynamic brake switch; and
a controller in communication with the power converter, the controller operable to gate on the dynamic brake switch when an experienced direct current (DC) bus voltage is equal to or greater than a threshold DC bus voltage, disable a threshold temperature rating for the dynamic brake switch when the dynamic brake switch is gated on, and gate off the dynamic brake switch when the experienced DC bus voltage is less than the threshold DC bus voltage.

16. The wind turbine system of claim 15, wherein the controller is further operable to enable the threshold temperature rating for the dynamic brake switch when the dynamic brake switch is gated off.

17. The wind turbine system of claim 15, wherein the controller is further operable to trip the power converter off when an experienced temperature of the dynamic brake switch is equal to or greater than the threshold temperature.

18. The wind turbine system of claim 17, wherein the controller is further operable to trip the power converter on when the experienced temperature of the dynamic brake switch is less than the threshold temperature.

19. The wind turbine system of claim 15, wherein the dynamic brake switch is an insulated-gate bipolar transistor.

20. The wind turbine system of claim 15, wherein the generator is a doubly fed induction generator.

* * * * *